Nov. 25, 1958    R. N. ROWE ET AL    2,862,117
BUS BAR DISTRIBUTION SYSTEM

Filed Dec. 23, 1957    2 Sheets-Sheet 1

INVENTORS
RAYMOND N. ROWE,
LYNN M. HARTON
BY Robert T. Casey
ATTORNEY

Nov. 25, 1958   R. N. ROWE ET AL   2,862,117
BUS BAR DISTRIBUTION SYSTEM
Filed Dec. 23, 1957   2 Sheets-Sheet 2

INVENTORS
RAYMOND N. ROWE,
LYNN M. HARTON
BY *Robert F. Casey*
ATTORNEY

United States Patent Office 2,862,117
Patented Nov. 25, 1958

2,862,117

BUS BAR DISTRIBUTION SYSTEM

Raymond N. Rowe, Plainville, and Lynn M. Harton, New Britain, Conn., assignors to General Electric Company, a corporation of New York Application December 23, 1957, Serial No. 704,594

12 Claims. (Cl. 307—147)

Our invention relates to multiphase electric power distribution systems and particularly to power distribution systems of the bus bar type, commonly referred to as busways.

Busways have historically comprised two primary types: (a) "feeder" type busways for carrying relatively large amounts of current with low voltage drop, and (b) "plug-in" type busways having spaced outlets thereon for receiving plug-in type power take-off devices. Feeder busways are characterized by the provision of more than one bar per electrical phase, the respective phase bars being closely spaced and interleaved or alternated for low reactance. For convenience, this type of busway, which is adapted to carry high currents but is not adapted to receive plug-in type power take-off devices, will be referred to as a "feeder-only" type busway. Plug-in busways are characterized by the provision of bus bars which are uninsulated to permit contact by a plug-in device and relatively widely spaced to provide adequate electrical clearance. For convenience, such busways will be referred to as "plug-in-only" busways.

Patent applications Nos. 609,906, filed September 14, 1956, and 599,405, filed July 23, 1956, both assigned to the same assignee as the present invention, disclose busway constructions adapted to perform both a feeder busway function and a plug-in busway function in a single device. Furthermore, in accordance with these applications, such a combined feeder-and-plug-in type of busway is provided having the bus bar terminations of each busway section disposed on the same center-to-center spacing as that utilized in prior feeder-only type busways, whereby such combined busway sections may be connected directly thereto if desired. The applications also disclose constructions of a combined feeder-and-plug-in type busway which may utilize conventional plug-in devices, similar to those used in plug-in-only type busways.

Since the combined system connects directly to a feeder-only system, the phase arrangement of bars at intermediate points therein is the same as that of the feeder-only system. In certain cases, this arrangement is not such as to provide desired phase connections when a conventional plug-in device is used on the combined system.

For example, a common electrical phase arrangement of bars in feeder-only-type busways of medium capacity having two bars per phase and one neutral bar, is: A—B—C—N—A—B—C. If a standard power take-off device such as used in a plug-in-only type system were used on a combined feeder-and-plug-in type busway which was connected to such a feeder-only system, and contacting every other bar in a group of six bars as taught by the above-identified applications, the bars contacted would be (starting from one side): A—C—A. Since this does not provide desired three-phase power, such devices cannot be used in these instances.

The problem is further complicated by the fact that, at each joint of busway sections of the combined feeder-and-plug-in type, it is desirable to connect all bars of common electrical identity or "phase" together, such connection being referred to as a "phase-collection" connection. The purpose of such a connection is to ensure that the current drawn by plug-in type power take-off devices, which contact only some of the bars, will be equally divided among all such bars throughout the major portion of the system. The making of such phase-collection connections is facilitated, in accordance with the system shown in the above-mentioned applications, by arranging the bus bars in offset or staggered relation, with bus bars of common phase having their ends upturned and aligned in a row transversely of the length of the housing. If the phase identity of such ends were changed, such, for instance, as by changing the phase identity of bars of one section to accommodate a plug-in device, such transverse alignment would be disrupted.

Accordingly, it is an object of the invention to provide a busway system including serially connected portions of feeder-type busway and combined feeder-and-plug-in type busway wherein the combined feeder-and-plug-in portions of the system are adapted to receive and properly energize standard plug-in type power take-off devices even though the arrangement of the bus bar conductors in the feeder portions is not as required by such devices.

It is likewise an object of the invention to provide an improved combined feeder-and-plug-in type power busway comprising discrete busway sections, capable of accepting and correctly energizing standard plug-in devices, which sections may be connected to a multiphase power source by connections which are arranged in the same sequence as the connections used in standard feeder-only systems, even though such sequence is not such as required by such standard plug-in devices. This object also includes the provision of such a combined system having discrete sections which may, therefore, be connected directly, bar-for-bar to a corresponding section of such standard feeder-only busway systems and vice-versa.

It is a further object of the invention to provide such a combined busway section which will accept and properly energize such plug-in devices whether such section is connected to a section of feeder-only busway or to another similar section of combined feeder-and-plug-in busway.

In accordance with the invention, there is provided a busway system including plug-in type power take-off devices and a first busway portion in which the bus bars are disposed in a first configuration not adapted to receive such plug-in devices and a serially connected portion in which the bus bars are disposed in a second configuration adapted to receive such plug-in devices, there being at least one bus bar cross-over or transposition between such portions.

In accordance with another aspect of the invention, there is provided a busway system including discrete busway sections each having a housing and a number of elongated bus bars supported in generally parallel relation therein and having the end portions thereof at at least one end of the section arranged in a predetermined sequence or configuration, at least two of such bus bars having their intermediate portions transposed within the housing so that the intermediate portions of such bus bars are arranged in a different predetermined sequence or configuration from that of the said end portions.

Furthermore, in accordance with the invention, there is provided a busway system including sections each having a number of parallel bus bars with the end portions thereof at both ends of the section arranged in the same predetermined sequence or configuration, at least two of such bars being crossed or transposed at two points along the length thereof so that the intermediate portions of such bus bars are arranged in a different predetermined sequence or configuration from that of the said ends.

In providing a busway including sections comprising a housing and a plurality of parallel bus bars therein, with a cross-over or transposition of bus bars within said housing as required in the arrangements described in the above summary of one aspect of the invention, certain other problems are encountered. Heretofore, transposition of bars in a power busway has been accomplished by jumper connections between adjacent ends of bus bars of succeeding sections, see, for example, Patent No. 2,786,151, issued March 19, 1957, to L. E. Fisher, and assigned to the same assignee as the present invention. The making of a transposition, according to the prior art, involved forming a jumper strap and connecting the jumper strap between two bus bar ends so as to straddle an intermediate bar. This construction is relatively expensive and requires additional space beyond that occupied by the bus bars proper, so that it is necessary to provide the housing with an enlargement at such point. Such a transposition is particularly difficult to make at an intermediate portion of a busway housing.

It is a further object of our invention, therefore, to provide a busway distribution system including elongated bus bars which are transposed in position without requiring separate cross-over connectors or jumpers.

It is another object of our invention to provide a busway construction including a number of elongated bus bars assembled in a predetermined configuration and occupying in that configuration a predetermined cross sectional area, and a transposition arrangement whereby the bus bars assume a different configuration within the same general cross sectional area, the transposition being accomplished within the same cross sectional area.

The scope of the invention will be particularly pointed out in the appended claims. The construction and operation of a specific embodiment, however, will be clearly understood from the following detailed description, taken in conjunction with the accompanying drawings, in which:

Figure 1:
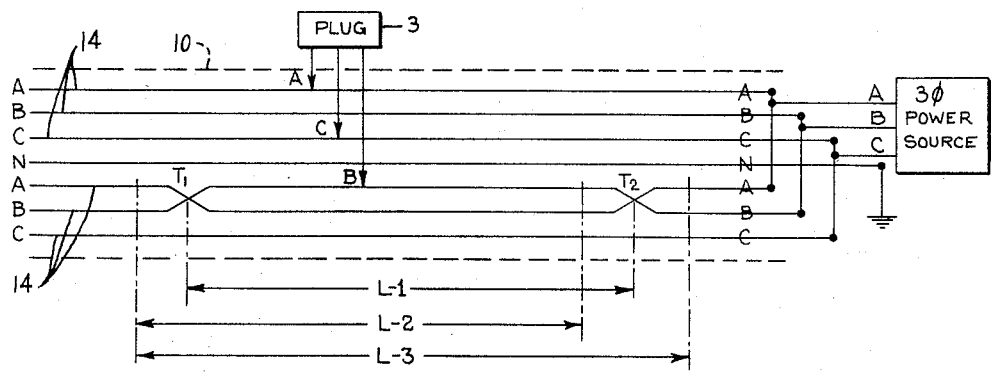
Figure 1 is a schematic representation of busway system incorporating the invention.

Referring to the drawings, the invention is shown as embodied in a busway shown schematically in Figure 1 and including a number of parallel elongated bus bars 14, mounted within a suitable metallic housing 10 by suitable insulating means, not shown. The system depicted is adapted for connection to a three-phase power source and includes two bus bars per phase, and one neutral or ground conductor, the bars being connected in interleaved fashion so that the electrical identity of the bars, starting from one side of the busway, is A—B—C—N—A—B—C. A plug-in type power take-off device 3 is mounted on the housing 10 and includes contacts having a plug-in type engagement with each of three non-adjacent bus bars, the bus bars, contacted being the first, third and fifth bus bars counting from one side. For a purpose to be described, two of the bus bars 14 have their intermediate portions transposed at two points $T_1$ and $T_2$.

It will be observed that if the phase identity of the bars were maintained identical with the phase arrangement at the end near the phase source, the bars contacted by the plug-in type device 3 would be bars A, C, and A. Because of the transposition provided in the intermediate portion, however, the bus bars contacted by the device 3 are actually bars A, C, and B, thereby providing one contact for each of the three phases of the system. The bus bar arrangement shown in the right and left end portions of the busway illustrated in Figure 1 is the configuration commonly used in feeder-only type busways, which is not adapted to receive plug-in type power take-off devices. The intermediate portion, between the transpositions $T_1$ and $T_2$, however, constitutes a combined plug-in and feeder-type power busway, which can accept such power take-off devices.

Figure 2:
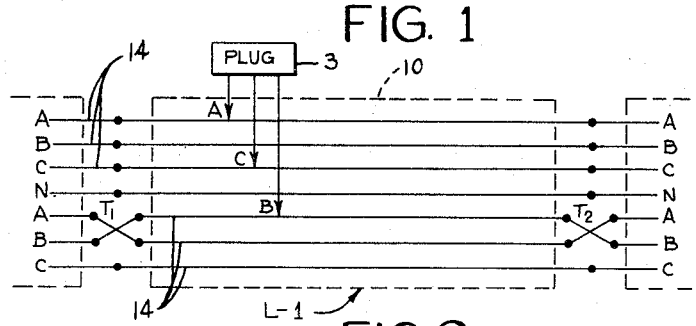
Figure 2 is a schematic representation showing a particular arrangement and interconnection of busway sections making up a system having the conductor arrangement of Figure 1.

In order to provide a system which is flexible and readily installed, the busway is preferably provided in discrete busway sections or lengths, each comprising a housing length having bus bars therein with the opposite ends thereof available for connection to other adjacent sections. It will be apparent that the system illustrated in Figure 1 may be divided into lengths having different characteristics, depending on the location of the section dividing lines. Thus, for instance, a section may be provided such as indicated at $L_1$ in which the required transpositions are each located at a point of interconnection of two of such lengths. A system having this arrangement is shown schematically on an enlarged scale in Figure 2, the outline of the section housings being indicated in dotted lines. Thus, the system of Figure 1, according to this form, may be made up of a plurality of busway sections, none of which includes transposition connections within the housing of the particular section, but wherein the required transpositions are provided at the interconnection of certain sections. In such a case, the transposition utilized could be as shown in the above-mentioned Fisher patent.

Figure 3:
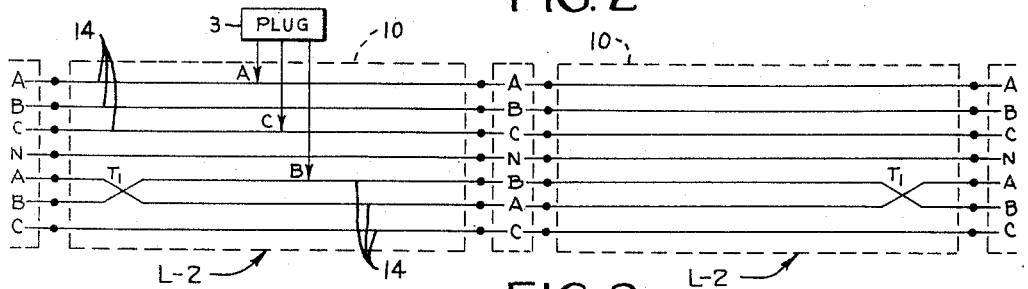
Figure 3 is a schematic representation showing another particular arrangement and interconnection of busway sections making up a system having the conductor arrangement of Figure 1.
Figure 4:
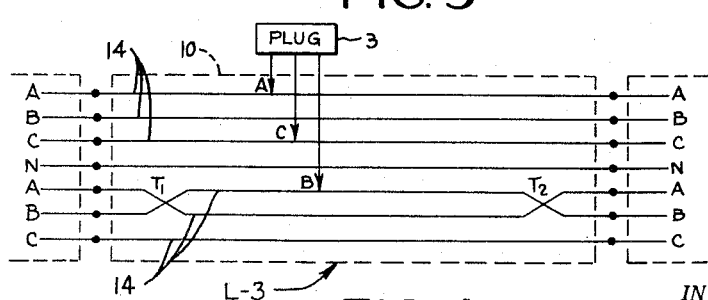
Figure 4 is a schematic representation showing a third particular arrangement and interconnection of busway sections making up a system having the conductor arrangement of Figure 1.

If desired, the system of Figure 1 may be divided into sections such as indicated at $L_2$ and shown particularly in Figure 3, which may be connected directly to adjacent sections without a transposition, the transposition being provided within the housing of a particular section. In this case, a single transposition is utilized in such a length, adjacent lengths thereafter being of the ordinary or untransposed type, thereby extending the phase bar arrangement of the combined feeder and plug-in type. When it is desired to return the phase arrangement of the bars to the standard or feeder only arrangement, a second length similar to $L_2$ is connected, thereby returning the bars to their original configuration.

A third alternative is to choose the sections so that both transposition $T_1$ and $T_2$ are included in a single busway section, as indicated at $L_3$. By this means, a busway section is provided having the combined feeder and plug-in bus bar arrangement or configuration at its intermediate portions, but having the standard feeder-only busway configuration at each end thereof. This particular arrangement has many advantages, such, for instance, as making it possible to connect this length directly to a feeder-only system bar-for-bar without a transposition connection at the joint, and also making it possible to connect thereto a second section of feeder-only busway with the bus bars in the proper configuration. Or, if desired, a number of such combined feeder and plug-in busway sections may be connected directly together in series. Thus, this type of section is completely interchangeable with sections of feeder-only type busway. This greatly increases the safety of this system and avoids the necessity for detailed or complicated instructions to the user as well as difficulties which might arise whenever such a system is relocated or when sections thereof are replaced.

Figure 5:
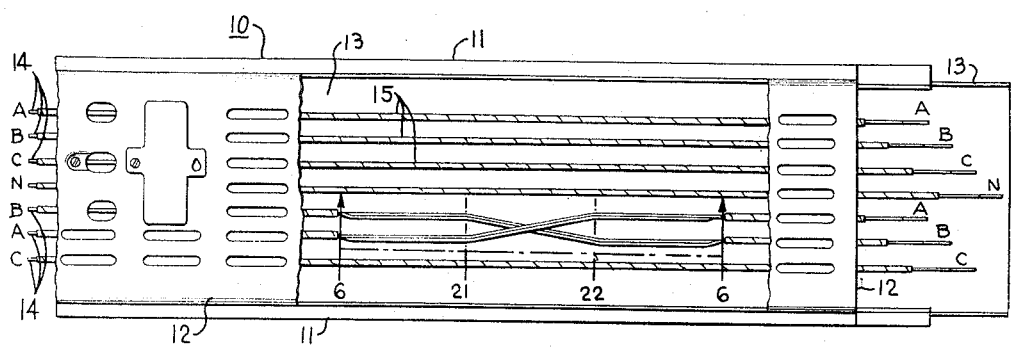
Figure 5 is a plan view of a section of busway showing a particular bus bar transposition construction.

In Figure 5 there is shown a specific embodiment of a busway section such as L₃, including a metallic housing 10, generally rectangular in shape and including opposed side portions 11 and top and bottom cover plates 12 and 13 respectively.

Supported within the housing 10 are a plurality of elongated strap-like bus bars 14 arranged in side-by-side relation in a row transversely of the housing, and each including an insulating covering 15. The bus bars 14 are longitudinally offset in the housing 10 or staggered so that bars arranged for connection to a particular phase of a multiphase power system have their ends aligned transversely of the housing at the housing ends. This arrangement permits the ready interconnection of similar phase bars by removing the connection point of any two bars from the immediate vicinity of the connecting point of any other two bars, and it also permits the ready interconnection of all bars of a common electrical phase, known as a phase collection connection by cross-connecting straps (not shown).

Figure 7:
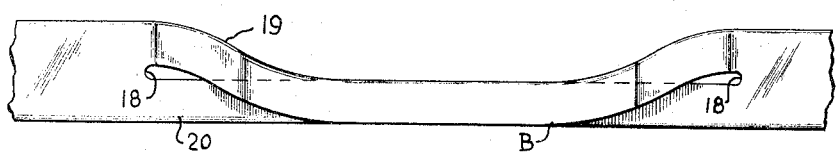
Figure 7 is a side elevation view of one of the bus bars of Figure 6.
Figure 6:
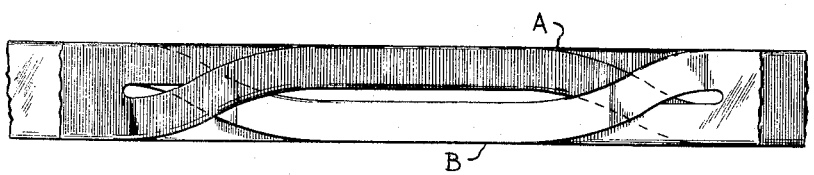
Figure 6 is a sectional view taken on the line 6—6 of Figure 5.

The form of the invention shown in Figure 5 includes a bus bar transposition construction particularly adapted for use in a busway section at an intermediate portion thereof and entirely within the busway housing. For this purpose, each of the bus bars A and B of the second or lower phase group has an elongated slot 18 (see Figure 7) cut in an intermediate portion thereof, and forming two generally parallel separated intermediate portions 19 and 20 of the bar A. The portion 19 is then deformed sideways out of the plane of the bar A and also downwardly so that its intermediate portion extends alongside of and parallel to the intermediate portion of the portion 20 of the bar A, as illustrated in Figure 7. Both bars are then bent along two lines 21 and 22 in their intermediate side-by-side portions, as indicated in Figure 5. Thus, the height of each bus bar is reduced at the intermediate portions to less than one-half its original height while the thickness is increased at this point to double the original thickness. The bars are thus able to be crossed over and transposed without the necessity for separate connections at this point. The bars are then covered with suitable insulation such as by wrapping to insulate each bar through this intermediate portion. It will be understood that the bars of phases A and B are similarly treated by slotting, bending and are placed in reversed positions as indicated in Figures 5 and 6.

In accordance with this aspect of the invention, it is, therefore, possible to transpose two bars without bending either bar out of the space occupied by the side-by-side assembly of bars. This makes it possible to utilize a standard housing for such transposition.

While only certain specific embodiments of the invention have been shown, it will be readily appreciated that many modifications thereof may be made without departing from the spirit and scope of the invention, and we, therefore, intend by the appended claims to cover all such modifications as fall within the true spirit and scope of the invention.

What we claim as new and desire to secure by Letters Patent of the United States is:

1. A multiphase electric power busway system having at least two bus bars per phase and comprising a combined feeder-and-plug-in portion having the phase bars thereof disposed in a first configuration wherein at least one of each of said phase bars is adapted to be contacted by a contact of a plug-in type power take-off device, and a feeder-only portion having the phase bars thereof disposed in a second configuration not adapted for contact by said plug-in type power take-off device, at least two of said phase bars being transposed in position between said feeder-only portion and said combined feeder-and-plug-in portion.

2. A multiphase electric power busway system having at least two bus bars per phase and comprising a plurality of interconnected discrete busway sections, at least one of said sections comprising a combined-feeder-and-plug-in section having the phase bars thereof disposed in a first configuration wherein at least one of each of said phase bars is adapted to be contacted by a contact of a plug-in type power take-off device, and a second section adjacent said first section having the phase bars thereof disposed in a second configuration not adapted for contact by said plug-in type power take-off device, and at least one bus bar transposition connection between said adjacent sections.

3. An electric power busway section comprising an elongated metallic housing, a plurality of bus bars supported in generally parallel insulated relation within said housing and having terminal portions at each end of said housing accessible for connection, at least two of said bus bars having their intermediate portions transposed within said housing with respect to their terminal portions at at least one end of said housing.

4. A plug-in type electric power busway section comprising an elongated metallic housing, a plurality of bus bars supported in generally parallel insulated relation in said housing, at least some of said bus bars having intermediate portions thereof adapted to be contacted by a plug-in type power take-off device, at least two of said bus bars having intermediate portions thereof transposed within said housing with respect to their terminal portions at at least one end of said housing.

5. A plug-in type electric power busway section comprising an elongated metallic housing, a plurality of bus bars supported in generally parallel insulated relation in said housing, said bus bars having terminal connecting portions arranged in a first predetermined configuration at each end of said housing, at least some of said bus bars having intermediate portions thereof adapted to be contacted by a plug-in type power take-off device, said bus bars being arranged in a second predetermined configuration different from said first configuration at said intermediate plug-in portions.

6. An electric power busway section comprising an elongated housing, a plurality of strap-like bus bars supported in side-by-side generally parallel insulated relation with their wide faces adjacent each other in a row transversely of said housing with the opposite edges thereof in a common plane respectively throughout the major intermediate portion thereof, at least two of said bus bars having an intermediate portion thereof transposed within said housing, said two bus bars being formed to cross each other within said housing substantially entirely within the space defined by said planes of said edges.

7. A multiphase electric power busway section, for use with a power source comprising at least two electrical phases, a plurality of bus bars supported in generally parallel insulated relation within said housing and comprising at least two bus bars for each of said electrical phases, at least one of each of said phase bars having an intermediate portion thereof adapted for contacting by a plug-in type power take-off device, said intermediate portion being transposed in position with one of the remaining bus bars.

8. A combined feeder and plug-in type power busway section comprising an elongated metallic housing, a plurality of electrical bus bars supported in generally parallel insulated relation in said housing, and including at least two bus bars for connection to each phase of a multiphase power system, said bus bars for connection to each such electrical phase having their terminal end portions offset longitudinally with respect to each other, said bars for connection to a common phase having a common longitudinal position whereby the ends thereof are aligned transversely of said housing to facilitate their interconnection at such point, at least one of said common phase bars having an intermediate portion thereof adapted to be contacted by a plug-in type power take-off device, at least one of said phase bars having an intermediate portion thereof transposed in position with a conductor not of said phase.

9. An electric power busway section comprising an elongated metallic housing, a plurality of generally parallel bus bars supported in insulated relation within said housing, at least two of said bus bars having an intermediate portion thereof transposed within said metallic housing, each of said two conductors comprising a continuous unbroken integral elongated conductor extending from one end of said housing to the other, each of said conductors having portions thereof deformed at the transposition point to reduce one dimension thereof.

10. An electric power busway section comprising at least two elongated electrical bus bars, each of said bars having a width substantially greater than its thickness, each of said bus bars having an intermediate longitudinal portion thereof divided into two parallel longitudinal portions by a cut lengthwise thereof, one of said longitudinal portions being offset and deformed to lie closely alongside of said other portion through an intermediate portion thereof, said bars crossing each other to provide a portion having a width substantially one-half the original width of said bar, said bars being crossed at said portion of reduced width.

11. An electric power busway comprising at least two elongated electrical bus bars having their opposite edges in substantially common planes, each of said bus bars having an intermediate portion thereof with the edge portion thereof deformed out of said common plane toward the common plane of the other edges, said bus bars crossing each other at said point of deformation of said bars, without either of said bars projecting out of the space defined by said common parallel planes a substantial amount.

12. An electric power busway section as set forth in claim 10 wherein said bus bars extend in closely spaced generally parallel relation throughout the portions thereof immediately adjacent said transposition point.

No references cited.